June 9, 1925.                                                     1,541,638
F. GELSTHARP
METHOD AND APPARATUS FOR MAKING WIRE GLASS
Filed Sept. 26, 1922                    2 Sheets-Sheet 1

INVENTOR
Frederick Gelstharp
by
James C. Bradley
atty

June 9, 1925.  1,541,638

F. GELSTHARP

METHOD AND APPARATUS FOR MAKING WIRE GLASS

Filed Sept. 26, 1922  2 Sheets-Sheet 2

INVENTOR
Frederick Gelstharp
by
James C. Bradley
Atty

Patented June 9, 1925.

1,541,638

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

METHOD AND APPARATUS FOR MAKING WIRE GLASS.

Application filed September 26, 1922. Serial No. 590,637.

*To all whom it may concern:*

Be it known that I, FREDERICK GELSTHARP, a citizen of Great Britain, and a resident of Tarentum, in the county of Allegheny and State of Pennsylvania, have made a new and useful invention in Improvements in Methods and Apparatus for Making Wire Glass, of which the following is a specification.

Figure 1:
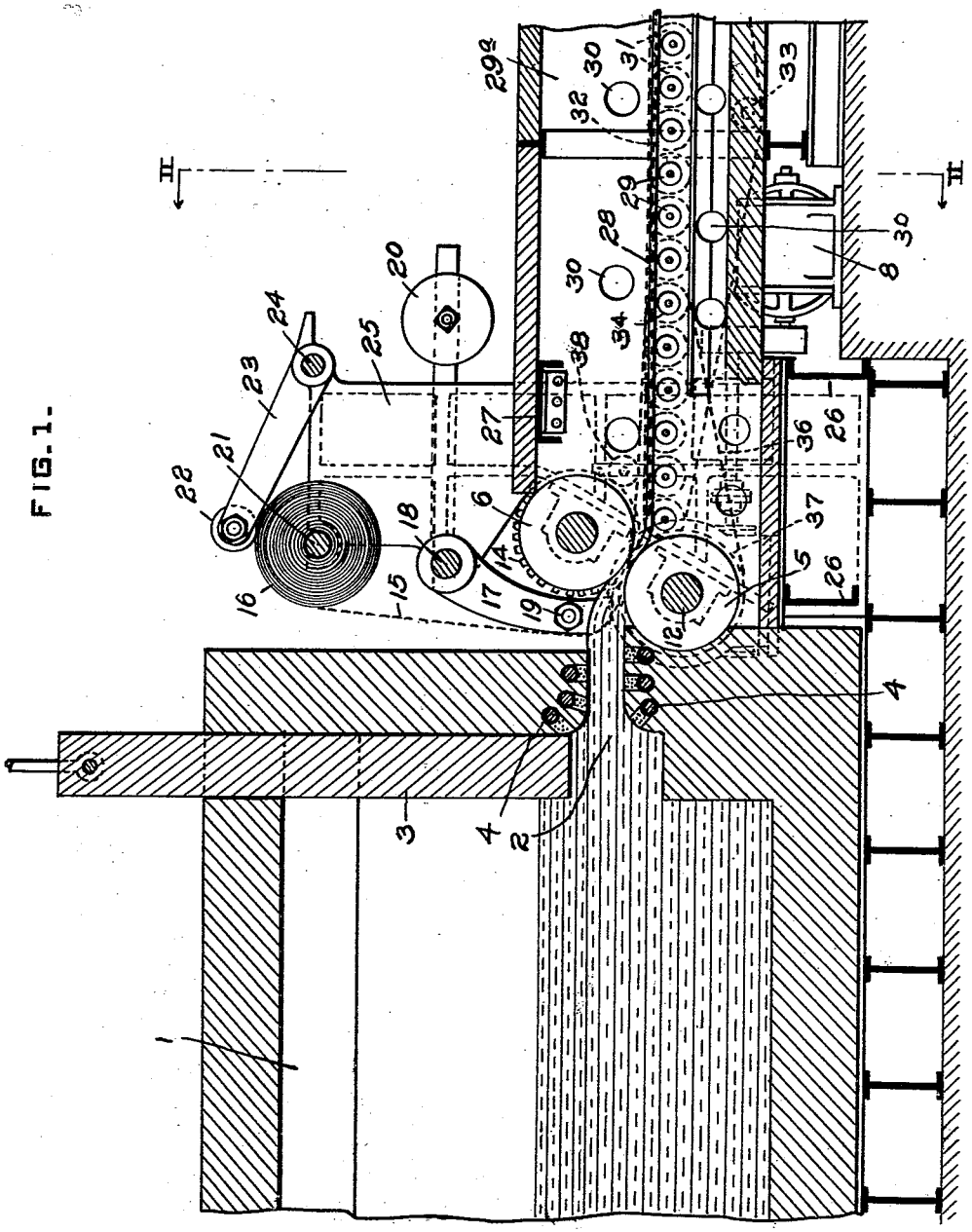
Figure 2:
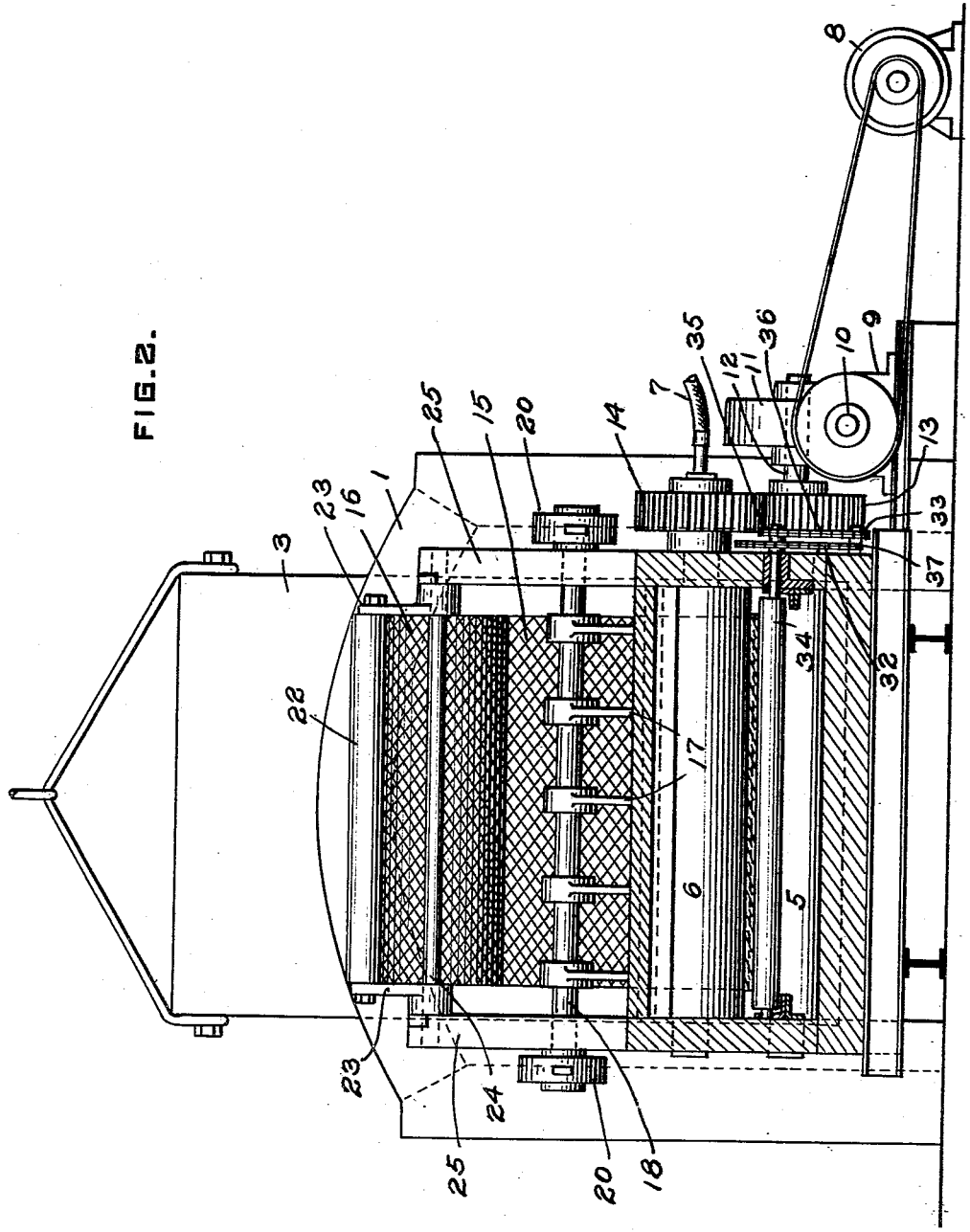

The invention relates to an apparatus for making wire glass. It has for its primary objects the provision of an improved apparatus for producing the glass in a continuous ribbon or sheet directly from a tank. One embodiment of the invention is illustrated in the accompanying drawings wherein:

Figure 1 is a vertical longitudinal section through the apparatus and Fig. 2 is a transverse section on the line II—II of Fig. 1.

Referring to the drawings 1 is the forward end or fore hearth of a melting tank provided with an orifice 2 and with a shear cake or block 3 suitably mounted for vertical movement and adapted to cut off the supply of glass to the orifice when occasion may require it. The orifice is preferably surrounded by a heating coil 4 of resistance material, such as nichrome, such coil being surrounded by suitable insulating material and maintained in position in the grooves formed in the clay wall by means of refractory cement. This heating device may come into play in regulating the temperature of the glass flowing through the slot or in remelting the glass in the slot after the tank has been shut down for repairs or for any other reason.

The glass as it flows from the orifice 2 passes between a pair of cooled rolls 5 and 6 which serve to reduce the ribbon or sheet of glass passing between the rolls to the desired thickness. The rolls are preferably water cooled by means of connections 7 swiveled to the ends of the rolls as indicated in Fig. 2.

The rolls are preferably driven from a motor 8, which is connected with suitable speed reducing mechanism in the casing 9. The shaft 10 of the reducing mechanism operates a worm gear drive in the casing 11, the worm wheel being keyed to the axle 12 of the lower roll 5. The axles of the two rolls 5 and 6 are provided with intermeshing spur gears 13 and 14, so that the upper roll is driven from the lower one. The ribbon of glass is provided with a wire mesh 15 from the spool 16, such wire being introduced into the molten glass behind the rollers, as indicated in Fig. 1. In order to properly position the wire mesh and apply tension thereto, the grid member 17 is preferably provided, such grid member being made up of a plurality of parallel plates (Fig. 2), mounted upon a rocker shaft 18 and having their lower ends secured together by means of the transverse rod 19, which rod is provided with suitable nuts and spacing members so that the bars constituting the grid are securely held in their proper relative positions. In order to provide the necessary tension upon the wire, the ends of the shaft 18 are provided with a pair of lever arms carrying the counterweights 20. The wire roll 16 is mounted upon an axle 21 and its rotation is retarded in any desired way so as to secure the necessary tension upon the wire mesh. This may be accomplished in the manner illustrated by use of the brake roll 22 carried by a pair of arms 23, pivoted upon the shaft 24. The rolls, the grid member, wire roll and brake device are all mounted upon a framework consisting preferably of a pair of cast side members 25, secured together by the transverse channels 26 and 27.

The lower ends of the bars constituting the grid member 17 are so positioned that the wire which passes thereover is guided so as to bring the wire mesh to the center of the ribbon which is formed between the rollers 5 and 6. This ribbon 28 carrying at its center the wire mesh, passes upon the series of rolls 29 leading from the squeezing and forming rolls and through the leer chamber 29$^a$.

The leer chamber is made of suitable length, and may be heated in any desired way. A number of openings 30 in the side walls are illustrated through which gas burners may be directed for giving the leer the proper temperature. This temperature is highest at the entrance end and decreases from the entrance to the outlet end. The glass ribbon as it passes between the rolls 5 and 6 has its upper and lower surfaces chilled and much cooler than the center portion and in order to properly anneal the sheet, it is necessary after the ribbon or sheet is received upon the transfer rollers 29 to bring the entire body of the sheet up to a uniform temperature from surface to surface. This heating operation may cause the sheet to sag slightly between the first few of the transfer rollers, but as the sheet progresses forwardly, it becomes straightened and gradually hardened until finally a perfectly flat sheet is secured. The bringing of the sheet to the relatively high temperature at the beginning of the annealing operation insures against any warping of the sheet after it hardens, which would not be the case if the sheet were allowed to cool down from a state in which the surfaces were much colder than the central portion.

The transfer rolls 29 are all provided with sprockets 31 on their ends which sprockets are engaged by an endless chain 32 traveling over the upper edges of the sprockets and returning beneath a suitable take-up sprocket 33 whereby the tension of the chain is adjusted. One of the leer rolls 34 is provided with an additional sprocket 35 and the chain 36 passing around that sprocket and around the sprocket 37 keyed to the shaft of the roll 5 serves to drive the chain 32 and the leer rolls, as the sprocket on the roll 34 engages the chain 32. A take-up sprocket 38 mounted for vertical adjustment serves to tighten the chain 36.

What I claim is:

Apparatus for forming sheet glass comprising a tank containing a bath of molten glass and having an orifice leading through one of its side walls below the surface of the glass, a pair of cooled rolls opposite the orifice and spaced apart a distance corresponding to the thickness of the glass sheet to be produced, and with the upper roll spaced away from the tank, and a grid for guiding a wire mesh between the rolls pivotally mounted above the rolls, and having its lower end between the orifice and the rolls and projecting down into the stream of glass passing from the orifice to the pass between the rolls.

In testimony whereof, I have hereunto subscribed my name this 22nd day of August, 1922.

FREDERICK GELSTHARP.